US010067375B2

(12) United States Patent
Yoon et al.

(10) Patent No.: US 10,067,375 B2
(45) Date of Patent: Sep. 4, 2018

(54) LIQUID CRYSTAL DISPLAY DEVICE

(71) Applicant: SAMSUNG DISPLAY CO., LTD., Yongin-si, Gyeonggi-Do (KR)

(72) Inventors: Yeo Geon Yoon, Suwon-si (KR); Jun Ho Song, Seongnam-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/382,878

(22) Filed: Dec. 19, 2016

(65) Prior Publication Data

US 2017/0276999 A1 Sep. 28, 2017

(30) Foreign Application Priority Data

Mar. 24, 2016 (KR) ........................ 10-2016-0035378

(51) Int. Cl.
*G02F 1/1335* (2006.01)
*G02F 1/1333* (2006.01)
*G02F 1/1362* (2006.01)
*G02F 1/1368* (2006.01)

(52) U.S. Cl.
CPC ...... *G02F 1/133528* (2013.01); *G02F 1/1368* (2013.01); *G02F 1/133345* (2013.01); *G02F 1/136209* (2013.01); *G02F 2001/133368* (2013.01); *G02F 2001/133548* (2013.01); *G02F 2001/136222* (2013.01); *G02F 2201/121* (2013.01); *G02F 2201/123* (2013.01)

(58) Field of Classification Search
CPC ......... G02F 1/133528; G02F 1/136209; G02F 1/1368; G02F 1/133345; G02F 2001/133368; G02F 2001/133548; G02F 2001/136222; G02F 2201/121; G02F 2201/123
See application file for complete search history.

(56) References Cited

U.S. PATENT DOCUMENTS

| 2003/0086032 A1* | 5/2003 | Yoon | G02F 1/133528 |
| | | | 349/96 |
| 2004/0001169 A1* | 1/2004 | Saiki | G02B 5/3033 |
| | | | 349/96 |
| 2015/0092140 A1* | 4/2015 | Takakuwa | G02B 5/3058 |
| | | | 349/96 |

(Continued)

FOREIGN PATENT DOCUMENTS

| KR | 1020100130762 | 12/2010 |
| KR | 1020150027683 | 3/2015 |

(Continued)

*Primary Examiner* — Donald Raleigh
(74) *Attorney, Agent, or Firm* — F. Chau & Associates, LLC

(57) ABSTRACT

A liquid crystal display device includes: a first substrate including an upper surface, a lower surface, and at least one lateral surface; a first polarization layer provided on the upper side of the first substrate; a light source provided on the at least one lateral side of the first substrate; a second substrate including an upper surface and a lower surface; a thin film transistor provided on the lower surface of the second substrate; a pixel electrode electrically connected to the thin film transistor; and a liquid crystal layer provided between the first substrate and the second substrate.

18 Claims, 6 Drawing Sheets

(56) References Cited

U.S. PATENT DOCUMENTS

| | | | |
|---|---|---|---|
| 2015/0138470 A1* | 5/2015 | Kang | G02F 1/1368 349/42 |
| 2015/0185555 A1 | 7/2015 | Kim et al. | |
| 2015/0185565 A1* | 7/2015 | Park | G02F 1/134363 349/43 |
| 2015/0293402 A1* | 10/2015 | Shinkai | H04N 13/0454 349/15 |

FOREIGN PATENT DOCUMENTS

| | | |
|---|---|---|
| KR | 1020150069324 | 6/2015 |
| KR | 1020150072534 | 6/2015 |
| KR | 1020150076005 | 7/2015 |

* cited by examiner

LIQUID CRYSTAL DISPLAY DEVICE

CROSS-REFERENCE TO RELATED APPLICATIONS

This application claims priority to and the benefit of Korean Patent Application No. 10-2016-0035378 filed in the Korean Intellectual Property Office on Mar. 24, 2016, the entire contents of which are incorporated by reference herein.

TECHNICAL FIELD

The described technology relates to a liquid crystal display device.

DISCUSSION OF RELATED ART

One of the most widely used flat panel displays is a liquid crystal display device. A liquid crystal display device includes two substrates with field generating electrodes, such as a pixel electrode and a common electrode, and a liquid crystal layer interposed there between. The liquid crystal layer includes liquid crystal molecules. An amount of transmitted light is controlled by determining an alignment of the liquid crystal molecules of the liquid crystal layer. The alignment of the liquid crystal molecules is determined through an application of voltages to the field generating electrodes to display an image.

The liquid crystal display device includes two sheets of display panels. The display panels include a thin film transistor array panel and an opposing display panel. The display panels also include a gate line transferring a gate signal and a data line transferring a data signal. The gate line and the data line are formed to cross each other. The display panels further include a thin film transistor connected with the gate line and the data line, a pixel electrode connected with the thin film transistor, and the like formed on the thin film transistor array panel. A light blocking member, a color filter, a common electrode, and the like may be formed on the opposing display panel. Alternatively, the light blocking member, the color filter, and the common electrode may be formed on the thin film transistor array panel.

Since the liquid crystal display device is not self-emissive, a light source is required. The light source may be a separately mounted artificial light source or natural light. The artificial light source requires a light guide plate (LGP) in order for emitted light to reach the entire display panel with uniform luminance.

Generally, the liquid crystal display device includes a backlight assembly. The backlight assembly includes a light source, a light guide and two sheets of display panels. Accordingly, the backlight assembly is relatively thick. The backlight assembly is formed of a rigid material. Therefore, it may be difficult to manufacture a flexible display device or a bending display device.

SUMMARY

Embodiments of the present invention provide a liquid crystal display device. More particularly, embodiments of the present invention provide a liquid crystal display device, which may include a reduced thickness and a simplified manufacturing process of a flexible display device.

An exemplary embodiment of the present invention provides a liquid crystal display device. The liquid crystal display device includes a first substrate, a first polarization layer, a light source, a second substrate, a thin film transistor, a pixel electrode, and a liquid crystal layer. The first substrate includes an upper surface, a lower surface, and at least one lateral surface. The first polarization layer is provided on the upper surface of the first substrate. The light source is provided on the at least one lateral surface of the first substrate. The second substrate includes an upper surface and a lower surface. The thin film transistor is provided on the lower side of the second substrate. The pixel electrode is electrically connected to the thin film transistor. The liquid crystal layer is provided between the first substrate and the second substrate.

The first polarization layer may include a wire grid polarization pattern.

The wire grid polarization pattern may include a metal material.

The liquid crystal display device may further include a common electrode. The common electrode may be provided on the first polarization layer.

The liquid crystal display device may further include a second polarization layer. The second polarization layer may be provided on the upper side of the second substrate.

The second polarization layer may include a polarization film.

An exemplary embodiment of the present invention provides a liquid crystal display device. The liquid crystal display device includes a first substrate, a first polarization layer, a light source, a second substrate, a thin film transistor, and a pixel electrode. The first polarization layer is provided on the first substrate. The light source may be provided on the first substrate. The thin film transistor is provided on the second substrate. The pixel electrode is provided on the second substrate. The pixel electrode is electrically connected to the thin film transistor.

The liquid crystal display device may further include a color filter. The color filter may be provided between the thin film transistor and the pixel electrode.

The liquid crystal display device may further include a light blocking member. The light blocking member may be provided below the pixel electrode. The light blocking member may overlap at least a portion of the thin film transistor.

The thin film transistor may include a gate electrode, a semiconductor, and a source electrode. The gate electrode may be provided on the second substrate. The semiconductor may be provided below the gate electrode. The source electrode and the drain electrode may be provided below the semiconductor. The gate electrode may include a low-reflection metal material.

The gate electrode may include at least one of chromium, molybdenum, and titanium.

A thickness of the first substrate may correspond to a thickness of the second substrate.

A thickness of the first substrate may be different from a thickness of the second substrate.

An exemplary embodiment of the present invention provides a liquid crystal display device. The liquid crystal display device includes a first substrate, a first polarization layer, a light source, a second substrate, a thin film transistor, and a low refractive layer. The first substrate includes an upper surface, a lower surface, and at least one lateral surface. The first polarization layer is provided on an upper surface of the first substrate. The light source may be provided on the at least one lateral surface of the first substrate. The second substrate includes and upper surface and a lower surface. The thin film transistor is provided on the lower surface of the second substrate. The pixel electrode is electrically connected to the thin film transistor. The low refractive layer is provided between the first substrate and the first polarization layer.

A refractive index of the low refractive layer may be lower than a refractive index of the first substrate.

The liquid crystal display device may further include a protruded pattern. The protruded patter may be provided between the low refractive layer and the first polarization layer.

A cross-sectional shape of the protruded pattern may be triangular or semi-circular.

The liquid crystal display device may further include a passivation layer. The passivation layer may be provided on the protruded pattern.

The liquid crystal display device may further include a second polarization layer. The second polarization pattern may be provided on the lower side of the second substrate.

The second polarization layer may include a wire grid polarization pattern.

BRIEF DESCRIPTION OF THE DRAWINGS

These and/or other aspects will become apparent and more readily appreciated from the following description of exemplary embodiments, taken in conjunction with the accompanying drawings, in which.

DETAILED DESCRIPTION OF THE EMBODIMENTS

Figure 1:
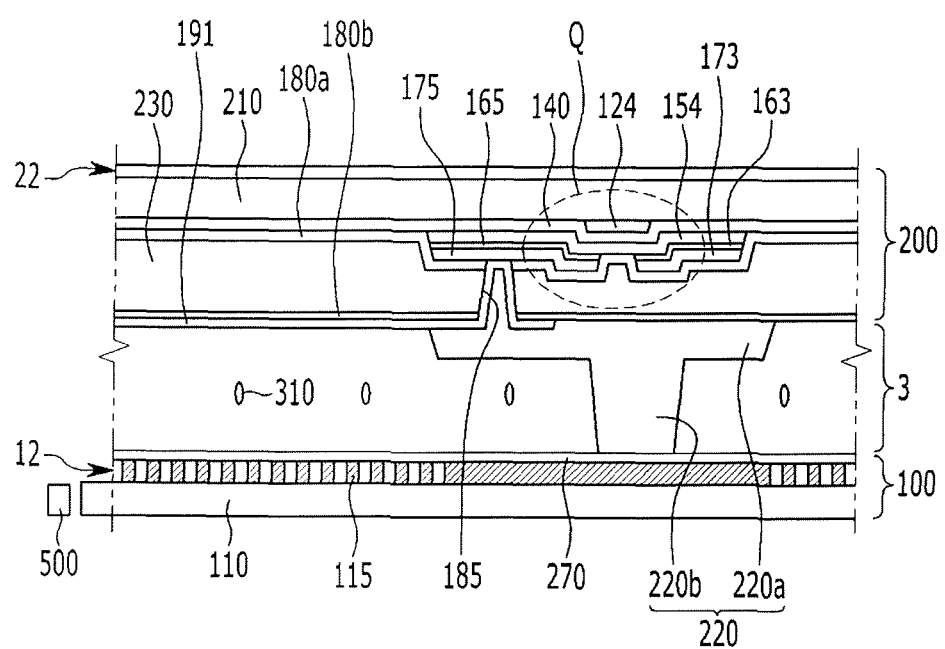
FIG. 1 illustrates a cross-sectional view of a liquid crystal display device according to an exemplary embodiment of the present invention.

Exemplary embodiments of the present invention will be described more fully hereinafter with reference to the accompanying drawings, in which exemplary embodiments of the present invention are shown. The described exemplary embodiments of the present invention may be modified in various different ways, all without departing from the spirit or scope of the present invention.

To clearly describe exemplary embodiments of the present invention, portions which do not relate to the description are omitted, and like reference numerals designate like elements throughout.

In addition, the size and thickness of each component shown in the drawings are arbitrarily shown for better understanding and ease of description, however, embodiments of the present invention are not limited thereto. For example, the thickness of layers, films, panels, regions, etc., are exaggerated for clarity. The thickness of the layers, films, panels, regions, etc., is enlarged in the drawings for better understanding and ease of description.

It will be understood that when an element such as a layer, film, region, or substrate is referred to as being "on" another element, it can be directly on the other element or intervening elements may also be present. Throughout this specification, the word "on" means positioning on or below the object portion, but does not essentially mean positioning on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, the phrase "in a plan view (or in-plane)" means when an object portion is viewed from above, and the phrase "in a cross-section" means when a cross-section taken by vertically cutting an object portion is viewed from the side.

FIG. 1 illustrates a cross-sectional view of a liquid crystal display device according to an exemplary embodiment of the present invention.

Referring to FIG. 1, the liquid crystal display device may include a first display panel 100, a second display panel 200, and a liquid crystal layer 3. The first display panel 100 and the second display panel 200 may face towards each other. The liquid crystal layer 3 may be provided between the first display panel 100 and the second display panel 200.

The first display panel 100 may include a first substrate 110. The first display panel 100 may also include a first polarization layer 12. The first polarization layer 12 may be provided on the first substrate 110.

The first substrate 110 may include a transparent glass or a plastic material. The first substrate 110 may include a bendable or foldable material. The liquid crystal display device may be configured with a flexible display device or a foldable display device.

The first substrate 110 may include an upper surface, a lower surface, and a lateral surface. The upper surface of the first substrate 110 may face toward the second display panel 200.

The first polarization layer 12 may be provided on the upper surface of the first substrate 110. The first polarization layer 12 may include a first wire grid polarization pattern 115. The first wire grid polarization pattern 115 may represent a pattern for polarizing visible rays with a wavelength. The wavelength may be of about 400 run to 800 nm. The first wire grid polarization pattern 115 may be a plane shape in which linear patterns are periodically disposed at regular intervals. The linear patterns may include a width of about 100 nm to about 200 nm. The first wire grid polarization pattern 115 may include a metal material. For example, the first wire grid polarization pattern 115 may include aluminum (Al), titanium (Ti), chromium (Cr), silver (Ag), gold (Au), nickel (Ni), or alloys thereof. The metal material may be deposited to generate a thin film. The thin film may be patterned according to a photolithography and etching process to generate the first wire grid polarization pattern 115.

The first display panel may further include a light source 500. The light source 500 may be provided on the lateral surface of the first substrate 110. The light source 500 may be configured with a light emitting diode (LED) and a cold cathode fluorescent lamp. The light source 500 may be provided on either lateral surface or both lateral surfaces of the first substrate 110.

A light emission direction of the light source 500 may be disposed toward the lateral surface of the first substrate 110. Light supplied by the light source 500 may be input into the first substrate 110 and may exit through the upper side of the first substrate 110. The light supplied to one lateral surface of the first substrate 110 may reach the opposite lateral surface through total reflection and may then exit. The first substrate 110 may function as a light guide plate for the light supplied by the light source 500. The first substrate 110 functioning as the light guide plate may allow light supplied by the light source 500 to uniformly pass through the upper surface of the first substrate 110.

A common electrode 270 may be provided on the upper surface of the first substrate 110. The common electrode 270 may be provided on the first polarization layer 12. The common electrode 270 may be provided on the entirety of the first substrate 110. A predetermined common voltage may be applied to the common electrode 270. Two voltages may be applied to the common electrode 270.

The common electrode 270 may include a transparent metal oxide such as an indium-tin oxide (ITO) or an indium-zinc oxide (IZO).

An insulating layer may be further provided between the first polarization layer 12 and the common electrode 270. The insulating layer may fill a region within the first wire grid polarization pattern 115. The insulating layer may also cover the first wire grid polarization pattern 115. The insulating layer may also flatten an upper surface of the first polarization layer 12. The first wire grid polarization pattern 115 may include a metal material. When the first wire grid polarization pattern 115 includes a metal material and the insulating layer is omitted, the wire grid polarization pattern 115 may conduct with the common electrode 270. Therefore, a resistance of the common electrode 270 may be reduced.

The second display panel 200 may include a second substrate 210, a thin film transistor Q, and a pixel electrode 191. The thin film transistor 210 may be provided between the second substrate 210 and the liquid crystal layer 3. The pixel electrode 191 may be connected to the thin film transistor Q.

The second substrate 210 may include a transparent glass or a plastic material. The second substrate 210 may include a bendable or foldable material. When the second substrate 210 includes a bendable or foldable material, the liquid crystal display device may be configured with a flexible display device or a foldable display device. A thickness of the second substrate 210 may be substantially equal to a thickness of the first substrate 110.

The second substrate 210 may include an upper surface, a lower surface, and a lateral surface. A lower surface of the second substrate 210 may face toward the first display panel 100. Particularly, the upper surface of the first substrate 110 may face toward the lower surface of the second substrate 210.

A thin film transistor Q may be provided on the lower side of the second substrate 210.

The thin film transistor Q may include a gate electrode 124, a semiconductor 154, a source electrode 173, and a drain electrode 175. The gate electrode 124 may be provided on the lower surface of the second substrate 210. The semiconductor 154 may be provided below the gate electrode 124. The source electrode 173 and the drain electrode 175 may be provided below the semiconductor 154.

The gate electrode 124 may include a metal material, particularly a low-reflection metal material. For example, the gate electrode 124 may include chromium (Cr), molybdenum (Mo), or titanium (Ti). Therefore, external light may be prevented from being reflected by the gate electrode 124 and becoming visible.

A gate line may be further provided on the lower surface of the second substrate 210. The gate electrode 124 may be connected to the gate line. The gate electrode 124 may receive a gate signal through the gate line.

A gate insulating layer 140 may be provided below the gate electrode 124. The gate insulating layer 140 may include an inorganic insulating material such as a silicon nitride (SiNx) or a silicon oxide (SiOx). The gate insulating layer 140 may be configured with a single layer or multiple layers.

The semiconductor 154 may be provided below the gate insulating layer 140. The semiconductor 154 may overlap the gate electrode 124. The semiconductor 154 may include an amorphous silicon (a-Si), polycrystalline silicon (poly-Si), or a metal oxide.

Ohmic contacts 163 and 165 may be provided below the semiconductor 154. The ohmic contacts 163 and 165 may include a material such as n+ hydrogenated amorphous silicon doped with a silicide or an n-type impurity at a high concentration. When the semiconductor 154 includes a metal oxide, the ohmic contacts 163 and 165 may be omitted.

The source electrode 173 and the drain electrode 175 may be provided below the ohmic contacts 163 and 165. The source electrode 173 and the drain electrode 175 may be separated from each other. The source electrode 173 and the drain electrode 175 may overlap the gate electrode 124.

A data line may be further provided below the ohmic contacts 163 and 165. The source electrode 173 may be connected to the data line. The source electrode 173 may receive a data voltage through the data line.

The gate electrode 124, the source electrode 173, and the drain electrode 175 may configure a thin film transistor Q together with the semiconductor 154. A channel of the thin film transistor Q may be provided on the semiconductor 154. The channel of the thin film transistor Q may be provided between the source electrode 173 and the drain electrode 175.

A first passivation layer 180a may be provided below the source electrode 173, the drain electrode 175, and the semiconductor 154. The first passivation layer 180a may include an inorganic insulating material such as a silicon nitride (SiNx) or a silicon oxide (SiOx).

A color filter 230 may be provided below the first passivation layer 180a. The color filter 230 may transmit substantially all light of primary colors such as red, green, and blue. The color filter 230 may also express transmit substantially all light of cyan, magenta, yellow, or a white-based color without being limited to the three primary colors. However, embodiments of the color filter 230 are not limited thereto. The liquid crystal display device may include a plurality of pixels. The plurality of pixels may be disposed in a matrix form, including pixel columns. Different color filters may be disposed for respective pixel columns.

A second passivation layer 180b may be provided below the color filter 230. The second passivation layer 180b may include an organic insulating material or an inorganic insulating material. The second passivation layer 180b may be configured with a single layer or multiple layers.

The first passivation layer 180a, the color filter 230, and the second passivation layer 180b may include a contact hole 185. The contact hole 185 may overlap at least a portion of the drain electrode 175.

The pixel electrode 191 may be provided below the second passivation layer 180b. The pixel electrode 191 may be provided in the contact hole 185. The pixel electrode 191 may be connected to the drain electrode 175 through the contact hole 185. Therefore, when the thin film transistor Q is turned on, the drain electrode 175 may receive a data voltage from the source electrode 173. The pixel electrode 191 may also receive a data voltage from the drain electrode 175. An electric field may be generated between the pixel electrode 191 and the common electrode 270. A direction of liquid crystal molecules 310 of the liquid crystal layer 3 may be determined. Luminance of the light passing through the liquid crystal layer 3 may become different according to the direction of the liquid crystal molecules 310.

The pixel electrode 191 may include a transparent metal oxide such as an indium-tin oxide (ITO) or an indium-zinc oxide (IZO).

A light blocking member 220 may be provided below the pixel electrode 191 and the second passivation layer 180b. The light blocking member 220 may overlap the thin film transistor Q. The light blocking member 220 may include a light blocking material. The light blocking material may prevent the leakage of light.

The light blocking member 220 may include a first light blocking member 220a and a second light blocking member 220b. The second light blocking member 220b may be thicker than the first light blocking member 220a. The second light blocking member 220b may correspond to a thickness of the liquid crystal layer 3. The second light blocking member 220b may also function as a spacer for maintaining a cell gap.

A second polarization layer 22 may be provided on the upper surface of the second substrate 210. The second polarization layer 22 may be formed of a polarization film. The second polarization layer 22 including a polarization film may be attached to the second substrate 210. An upper surface of the second polarization layer 22 may be processed with a low-reflection surface treatment. Therefore, external light may be prevented from being reflected by the second polarization layer 22 and becoming visible.

According to an exemplary embodiment of the present invention, the light supplied by the light source 500 may pass through the first display panel 100, the liquid crystal layer 3, and the second display panel 200. A screen may be displayed on the upper surface of the second display panel 200. The first polarization layer 12 including the first wire grid polarization pattern 115 may be provided on the first display panel 100. The thin film transistor Q and the pixel electrode 191 may be provided on the second display panel 200.

When the thin film transistor and the pixel electrode are provided on the first display panel may be considered as a comparative example. The wire grid polarization pattern, the thin film transistor, and the pixel electrode are provided on one substrate. Therefore, when a defect is generated in the wire grid polarization pattern during a manufacturing process, the first display panel is considered to be defective. This occurs even when the thin film transistor or the pixel electrode has no defect. Also, when a defect is generated to the thin film transistor or the pixel electrode, the first display panel is considered to be defective. This occurs even when the wire grid polarization pattern has no defect. Therefore, a yield of the process for manufacturing a liquid crystal display device is decreased.

In exemplary embodiments of the present invention, the yield may be improved by separating the display panel on which the first wire grid polarization pattern 115 is provided and the display panel on which the thin film transistor Q and the pixel electrode 191 are provided. Therefore, when the first wire grid polarization pattern 115 generates a defect and the thin film transistor Q and the pixel electrode 191 have no defect, the first display panel 100 on which the first wire grid polarization pattern 115 is provided may generate a defect.

Accordingly, the second display panel 200 on which the thin film transistor Q and the pixel electrode 191 are provided may be further used in a manufacturing process.

In an exemplary embodiment of the present invention, the thin film transistor Q may be provided on the lower surface of the second display panel 200. The gate electrode 124 may be provided below the second display panel 200. When the screen is displayed on the upper surface of the second display panel 200, external light input to the gate electrode 124 may be reflected and may become visible. Therefore, a black pixel may be visible as being white by the reflected light. In an exemplary embodiment of the present invention, the gate electrode 124 may include a low-reflection metal material. When the gate electrode 124 includes a low-reflection metal material, the gate electrode 124 may prevent the reflected light from becoming visible.

In the general liquid crystal display device, the liquid crystal layer is provided between the first display panel and the second display panel. An additional light guide plate is disposed, and the light source is disposed on a lateral side of the light guide plate. In an exemplary embodiment of the present invention, the light guide plate may be omitted by disposing the light source 500 on the lateral surface of the first display panel 100. Accordingly, a configuration of the liquid crystal display may be simplified and the weight and thickness of the liquid crystal display may be reduced. A process of manufacturing the liquid crystal display may also be simplified and manufacturing a flexible display device may be more easily obtainable.

Figure 2:
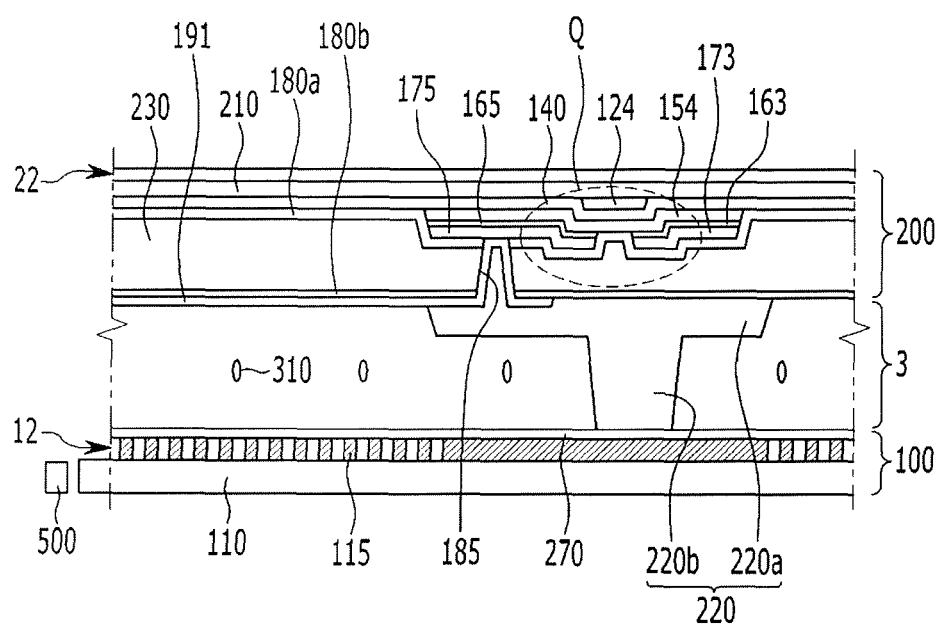
FIG. 2 illustrates a cross-sectional view of a liquid crystal display device according to an exemplary embodiment of the present invention.

FIG. 2 illustrates a cross-sectional view of a liquid crystal display device according to an exemplary embodiment of the present invention.

Several aspects of the liquid crystal display device according to an exemplary embodiment of the present invention as illustrated in FIG. 2 are similar to the exemplary embodiment of the present invention as described in reference to FIG. 1. Accordingly, redundant explanations may be omitted.

Referring to FIG. 2, the liquid crystal display device may include a first display panel 100, a second display panel 200, and a liquid crystal layer 3. The first display panel 100 and the second display panel 200 may face towards each other. The liquid crystal layer 3 may be provided between the first display panel 100 and the second display panel 200.

The first display panel 100 may include a first substrate 110. The first display panel 100 may also include a first polarization layer 12. The first polarization layer 12 may be provided on the first substrate 110. The first polarization layer 12 may include a first wire grid polarization pattern 115. The second display panel 200 may include a second substrate 210, a thin film transistor Q, and a pixel electrode 191. The thin film transistor Q may be provided below the second substrate 210. The pixel electrode 191 may be connected to the thin film transistor Q.

According to an exemplary embodiment of the present invention, a thickness of the second substrate 210 may be different from a thickness of the first substrate 110. As illustrated in FIG. 1, the second substrate 210 may be thicker than the first substrate 110. As illustrated in FIG. 2, the first substrate 110 may be thicker than the second substrate 210.

The first substrate 110 may function as a light guide plate for the light supplied by the light source 500. The first substrate 110 functioning as the light guide plate may allow light supplied by the light source 500 to uniformly pass through the upper surface of the first substrate 110. When the first substrate 110 is relatively thin, less light may be present. Therefore, it may be desirable for the first substrate 110 to be relatively thick. For example, the first substrate 110 may be from about 0.7 mm to about 1.0 mm.

The second substrate 210 may be relatively thin. As the second substrate 210 is formed to be thinner, it may be advantageous to manufacture a flexible display device or a foldable display device. For example, the second substrate 210 may be about 0.5 mm.

When the first substrate 110 and the second substrate 210 are relatively thin, the loss of light supplied by the light source may increase. Accordingly, when the first substrate 110 and the second substrate 210 are relatively thick, it may be difficult to manufacture a flexible display device or a foldable display device. In an exemplary embodiment of the present invention, the first substrate 110 functioning as the light guide plate may be relatively thick. The second substrate 210 may be relatively thin. Therefore, the loss of light may be reduced and manufacturing a flexible display device or a foldable display device may be more easily obtainable.

Figure 3:
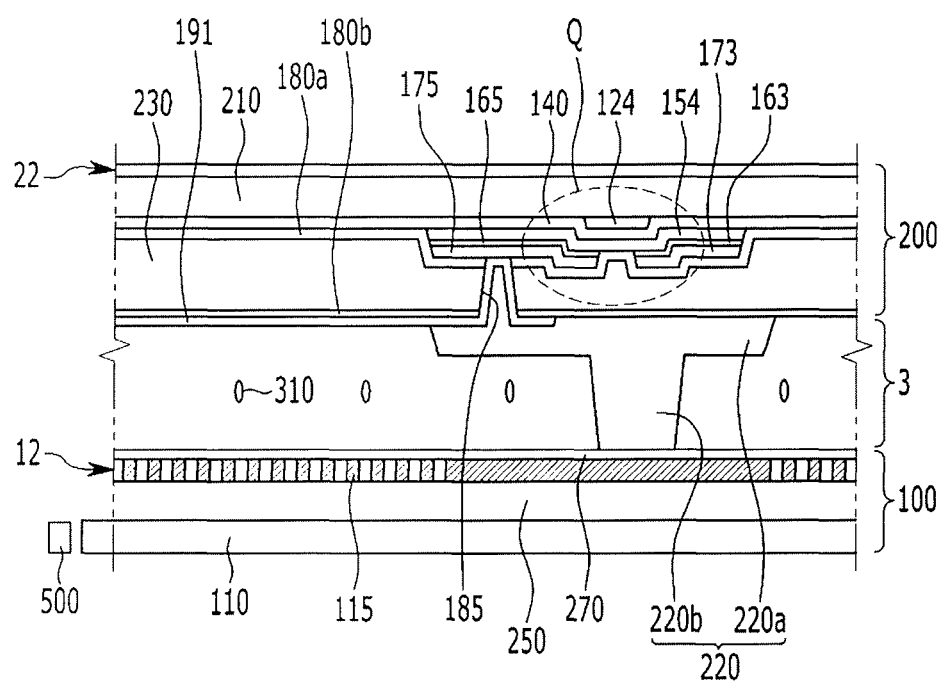
FIG. 3 illustrates a cross-sectional view of a liquid crystal display device according to an exemplary embodiment of the present invention.

FIG. 3 illustrates a cross-sectional view of a liquid crystal display device according to an exemplary embodiment of the present invention.

Several aspects of the liquid crystal display device according to an exemplary embodiment of the present invention as illustrated in FIG. 3 are similar to the exemplary embodiment of the present invention as described with reference to FIG. 1. Accordingly, redundant explanations may be omitted.

According to FIG. 3, the liquid crystal display device may include a first display panel 100, a second display panel 200, and a liquid crystal layer 3. The first display panel 100 and the second display panel 200 may face towards each other. The liquid crystal layer 3 may be provided between the first display panel 100 and the second display panel 200.

The first display panel 100 includes a first substrate 110, a first polarization layer 12, and a low refractive layer 250. The first polarization layer 12 may be provided on the first substrate 110. The low refractive layer 250 may be provided between the first substrate 110 and the first polarization layer 12. The low refractive layer 250 may be provided on the first substrate 110. The first polarization layer 12 may be provided on the low refractive layer 250.

The low refractive layer 250 may include a material with a refractive index. The refractive index of the material included in the low refractive layer 250 may be lower than a refractive index of the first substrate 110. The refractive index of the first substrate 110 may be greater than about 1.5 and less than about 2.0. In this instance, the low refractive layer 250 may include a material with a refractive index that is less than about 1.0. A material with a refractive index that is lower than that of the first substrate 110 may be coated on the first substrate 110. A bake process may be performed to generate the low refractive layer 250.

The light supplied by the light source 500 may be input to the lateral surface of the first substrate 110. The light provided by the light source 500 may be substantially completely reflected into the first substrate 110 may move therein. The total reflection may be generated when light progresses to a medium with a small refractive index from a medium with a large refractive index. In an exemplary embodiment of the present invention, the low refractive layer 250 with a refractive index that is lower than that of the first substrate 110 may be provided on the first substrate 110. Therefore, a substantially complete reflection of the light provided by the light source may be induced. When an incident angle of the light input to the first substrate 110 is less than a threshold angle of the total reflection, the light may pass through the first substrate 110.

When the substantially complete reflection is not generated in the first substrate 110, most of the light supplied by the light source 500 may pass through a partial region of the first substrate 110. A partial region of the first substrate 100 may include an edge that is the closest to the light source 500. Therefore, the light might not be sufficiently supplied to a portion that is distant from the light source 500. In an exemplary embodiment of the present invention, the low refractive layer 250 may be provided on the first substrate 110, which may induce a substantially complete reflection in the first substrate 110. Therefore, the light may be sufficiently supplied to the portion that is distant from the light source 500. Therefore, uniformity of the light leaving the upper side of the first substrate 110 may be increased.

Figure 4:
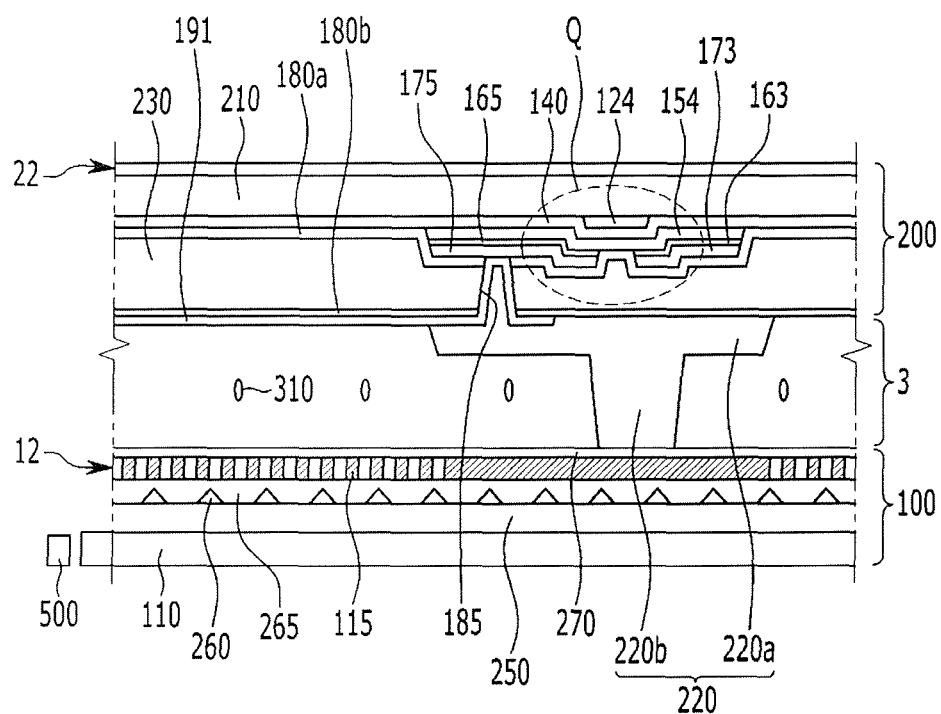
FIG. 4 illustrates a cross-sectional view of a liquid crystal display device according to an exemplary embodiment of the present invention.

FIG. 4 illustrates a cross-sectional view of a liquid crystal display device according to an exemplary embodiment of the present invention.

Several aspects of the liquid crystal display device according to an exemplary embodiment of the present invention as illustrated in FIG. 4 are similar to the exemplary embodiment of the present invention as described with reference to FIG. 3. Accordingly, redundant explanations may be omitted. Referring to FIG. 4, the liquid crystal display device may include a first display pane 100, a second display panel 200, and a liquid crystal layer 3. The first display panel 100 and the second display panel 200 may face towards each other. The liquid crystal layer 3 may be provided between the first display panel 100 and the second display panel 200.

The first display panel 100 may include a first substrate 110, a first polarization layer 12, a low refractive layer 250, and a protruded patter 260. The first polarization layer 12 may be provided on the first substrate 110. The low refractive layer 250 may be provided between the first substrate 110 and the first polarization layer 12. The protruded pattern 260 may be provided between the low refractive layer 250 and the first polarization layer 12. The low refractive layer 250 may be provided on the first substrate 110. The protruded pattern 260 may be provided on the low refractive layer 250. The first polarization layer 12 may be provided on the protruded pattern 260.

The protruded pattern 260 may include a prism shape. A cross-sectional shape of the protruded pattern 260 may be triangular. The protruded pattern 260 may include a shape protruding from the upper surface of the low refractive layer 250. Light passing through the first substrate 110 and the low refractive layer 250 may pass through the protruded pattern 260, which may change a progression direction thereof. The light may progress in a vertical direction to the first substrate 110 by the protruded pattern 260. Therefore, the light progressing in an oblique direction with respect to the first substrate 110 may be prevented from being lost or from influencing adjacent pixels to cause a color shift. Accordingly, the protruded pattern 260 may function as a prism sheet.

The protruded pattern 260 may be generated by using a mold or a photolithography process. For example, a material layer may be generated on the low refractive layer 250 by using one of a sheet, poly(methylmethacrylate) (PMMA), and polyimide (PI). The mold may be provided on the material layer. The mold may be pressurized to generate the protruded pattern 260. Alternatively, a material layer may be generated on the low refractive layer 250 with an acryl, a photoresist, or an organic layer. The material layer may be patterned through the photolithography process to generate the protruded pattern 260.

A third passivation layer 265 may be provided on the protruded pattern 260. The third passivation layer 265 may include an inorganic insulating material such as a silicon nitride (SiNx) or a silicon oxide (SiOx). The first polarization layer 12 may be provided on the third passivation layer 265.

Figure 5:
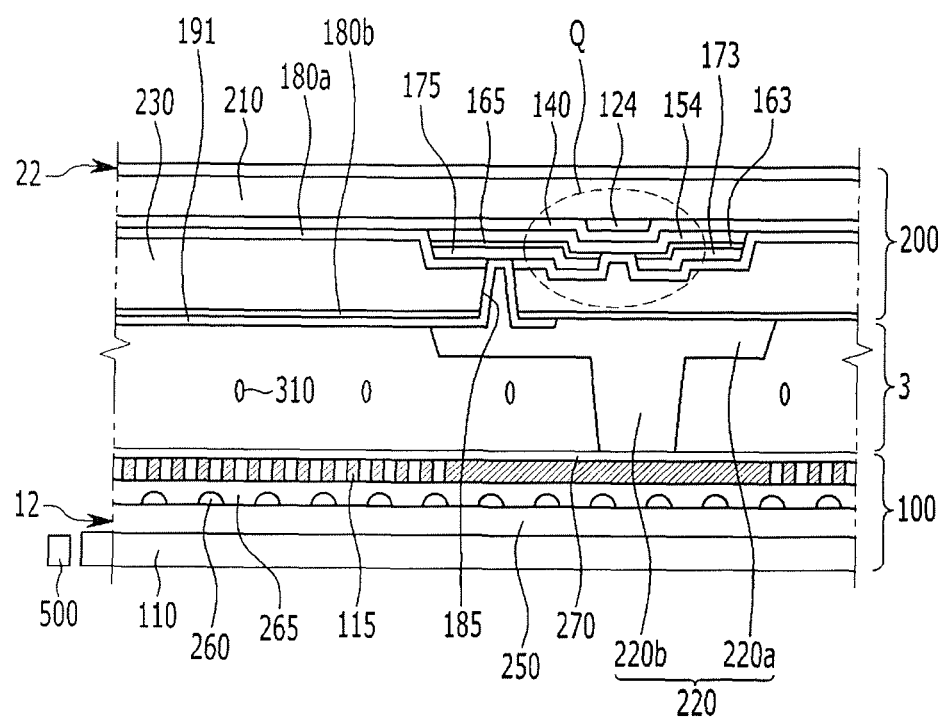
FIG. 5 illustrates a cross-sectional view of a liquid crystal display device according to an exemplary embodiment of the present invention.

FIG. 5 illustrates a cross-sectional view of a liquid crystal display device according to an exemplary embodiment of the present invention.

Several aspects of the liquid crystal display device according to an exemplary embodiment of the present invention as illustrated in FIG. 5 are similar to the exemplary embodiment of the present invention as described with reference to FIG. 4. Accordingly, redundant explanations may be omitted. Referring to FIG. 5, a protruded pattern 260 may be provided between the low refractive layer 250 and the first polarization layer 12.

The protruded pattern 260 may include a hemispherical shape. A cross-sectional shape of the protruded pattern 260 may be semi-circular. The protruded pattern 260 may include a shape protruding from the upper side of the low refractive layer 250.

Figure 6:
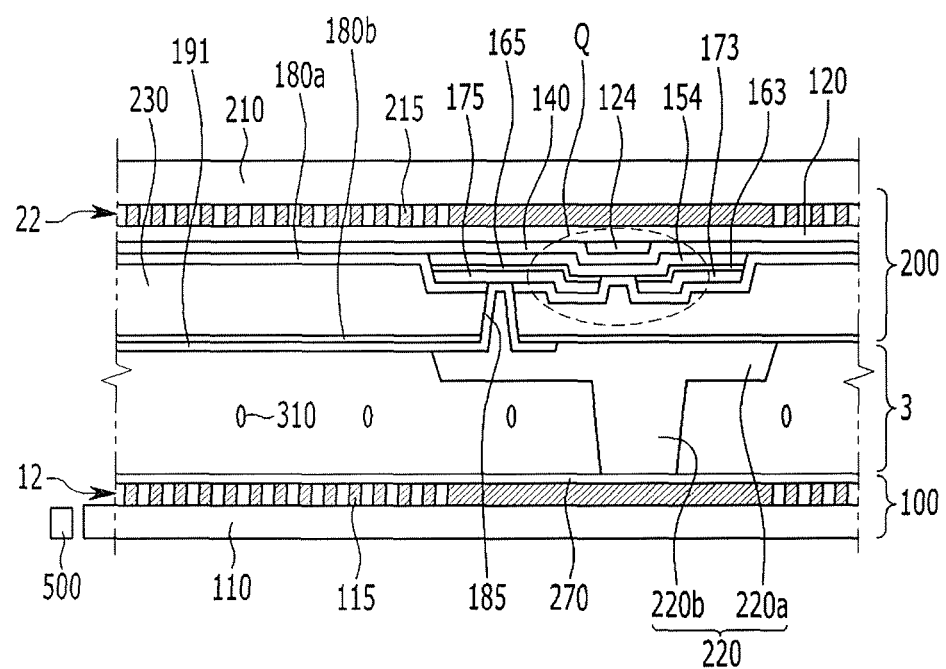
FIG. 6 illustrates a cross-sectional view of a liquid crystal display device according to an exemplary embodiment of the present invention.

FIG. 6 illustrates a cross-sectional view of a liquid crystal display device according to an exemplary embodiment of the present invention.

Several aspects of the liquid crystal display device according to an exemplary embodiment of the present invention as illustrated in FIG. 6 are similar to the exemplary embodiment of the present invention as described with reference to FIG. 1. Accordingly, redundant explanations may be omitted. Referring to FIG. 6, the liquid crystal display device may include a first display pane 100, a second display panel 200, and a liquid crystal layer 3. The first display panel 100 and the second display panel 200 may face towards each other. The liquid crystal layer 3 may be provided between the first display panel 100 and the second display panel 200.

The second display panel 200 may include a second substrate 210, a thin film transistor Q, a pixel electrode 191, and a second polarization layer 22. The thin film transistor Q may be provided below the second substrate 210. The pixel electrode 191 may be connected to the thin film transistor Q. The second polarization layer 22 may be provided between the second substrate 210 and the thin film transistor Q. The second polarization layer 22 may be provided below the second substrate 210. The thin film transistor Q may be provided below the second polarization layer 22.

The second polarization layer 22 may include a second wire grid polarization pattern 215. The second wire grid polarization pattern 215 of the second polarization layer 22 may be generated to be similar to the first wire grid polarization pattern 115 of the first polarization layer 12. The second wire grid polarization pattern 215 of the second polarization layer 22 may include a plane shape in which linear patterns are periodically disposed at regular intervals. The linear patterns may include a width of about 100 nm to about 200 nm. Formation of the second wire grid polarization pattern 215 of the second polarization layer 22 may be different than formation of the first wire grid polarization pattern 115 of the first polarization layer 12. The second wire grid polarization pattern 215 may include a metal material. For example, the second wire grid polarization pattern 215 may include aluminum (Al), titanium (Ti), chromium (Cr), silver (Ag), gold (Au), nickel (Ni), or alloys thereof. The metal material may be deposited to generate a thin film. The thin film may be patterned through the photolithography and etching process to generate the second wire grid polarization pattern 215.

An insulating layer 120 may be provided between the second polarization layer 22 and the thin film transistor Q. The insulating layer 120 may include an inorganic insulating material such as a silicon nitride (SiNx) or a silicon oxide (SiOx). The insulating layer 120 may prevent the second polarization layer 22 including a metal material and the gate electrode 124 of the thin film transistor Q from being short-circuited. The gate electrode 124 may be provided below the insulating layer 120.

While this disclosure has been described in connection with exemplary embodiments of the present invention, it is to be understood that exemplary embodiments of the present invention are not limited thereto. Exemplary embodiments of the present invention as described herein are intended to cover various modifications and equivalent arrangements included within the spirit and scope of the appended claims.

What is claimed is:

1. A liquid crystal display device, comprising:
a first substrate including an upper surface, a lower surface, and at least one lateral surface;
a first polarization layer provided on the upper surface of the first substrate;
a light source provided on the at least one lateral surface of the first substrate;
a second substrate including an upper surface and a lower surface;
a thin film transistor provided on the lower surface of the second substrate;
a pixel electrode electrically connected to the thin film transistor; and
a liquid crystal layer provided between the first substrate and the second substrate,
wherein
the first substrate is thicker than the second substrate; and
a thickness of the first substrate is from 0.7 mm to 1.0 mm.

2. The liquid crystal display device of claim 1, wherein the first polarization layer includes a wire grid polarization pattern.

3. The liquid crystal display device of claim 2, wherein the wire grid polarization pattern includes a metal material.

4. The liquid crystal display device of claim 1, further comprising
a common elect de provided on the first polarization layer.

5. The liquid crystal display device of claim 1, further comprising
a second polarization layer provided on the upper surface of the second substrate.

6. The liquid crystal display device of claim 5, wherein the second polarization layer includes a polarization film.

7. A liquid crystal display device, comprising:
a first substrate;
a first polarization layer provided on the first substrate;
a light source provided on the first substrate;
a second substrate;
a thin film transistor provided on the second substrate; and
a pixel electrode provided on the second substrate and electrically connected to the thin film transistor,
wherein:
the first substrate is thicker than the second substrate; and
a thickness of the first substrate is from 0.7 mm to 1.0 mm.

8. The liquid crystal display device of claim 7, further comprising a color filter provided between the thin film transistor and the pixel electrode.

9. The liquid crystal display device of claim 7, further comprising
a light blocking member provided below the pixel electrode, wherein the light blocking member overlaps at least a portion of the thin film transistor.

10. The liquid crystal display device of claim 7, wherein the thin film transistor includes
a gate electrode provided on the second substrate;
a semiconductor provided below the gate electrode; and
a source electrode and a drain electrode provided below the semiconductor, and
the gate electrode includes a low-reflection metal material.

11. The liquid crystal display device of claim 10, wherein the gate electrode includes at least one of chromium, molybdenum, and titanium.

12. A liquid crystal display device, comprising:
a first substrate including an upper surface, a lower surface, and at least one lateral surface;
a first polarization layer provided on the upper surface of the first substrate;
a light source provided on the at least one lateral surface of the first substrate;
a second substrate including an upper surface and a lower surface;
a thin film transistor provided on the lower surface of the second substrate;
a pixel electrode electrically connected to the thin film transistor; and
a low refractive layer provided between the first substrate and the first polarization layer,
wherein:
the first substrate is thicker than the second substrate; and
a thickness of the first substrate is from 0.7 mm to 1.0 mm.

13. The liquid crystal display device of claim 12, wherein a refractive index of the low refractive layer is lower than a refractive index of the first substrate.

14. The liquid crystal display device of claim 12, further comprising
a protruded pattern provided between the low refractive layer and the first polarization layer.

15. The liquid crystal display device of claim 14, wherein a cross-sectional shape of the protruded pattern is triangular or semi-circular.

16. The liquid crystal display device of claim 14, further comprising
a passivation layer provided on the protruded pattern.

17. The liquid crystal display device of claim 12, further comprising
a second polarization layer provided on the lower side of the second substrate.

18. The liquid crystal display device of claim 17, wherein the second polarization layer includes a wire grid polarization pattern.

* * * * *